US011553008B1

(12) United States Patent
Robinson et al.

(10) Patent No.: US 11,553,008 B1
(45) Date of Patent: Jan. 10, 2023

(54) ELECTRONIC AGENT SCRIBE AND COMMUNICATION PROTECTIONS

(71) Applicant: Netskope, Inc., Santa Clara, CA (US)

(72) Inventors: James S. Robinson, Indianapolis, IN (US); Damian C. Chung, Gilbert, AZ (US); Lamont Orange, Florissant, MO (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/566,125

(22) Filed: Dec. 30, 2021

(51) Int. Cl.
*H04L 9/40* (2022.01)

(52) U.S. Cl.
CPC ............ *H04L 63/205* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 8,131,808 B2 * | 3/2012 | Aoki | ................... | G06Q 10/107 709/224 |
| 8,255,683 B2 * | 8/2012 | Dickinson, III | .... | H04L 63/0263 713/153 |
| 8,260,633 B2 * | 9/2012 | Beraja | .................... | G16H 70/20 705/2 |
| 8,464,335 B1 * | 6/2013 | Sinha | ...................... | G06F 21/51 713/153 |
| 8,572,689 B2 | 10/2013 | Radhakrishnan | | |
| 8,694,556 B2 * | 4/2014 | Littooy | .................. | G06Q 40/08 707/758 |
| 9,083,750 B2 | 7/2015 | Gomez | | |
| 9,225,833 B1 * | 12/2015 | Koster | ............. | H04M 3/42221 |

(Continued)

FOREIGN PATENT DOCUMENTS

| | | |
|---|---|---|
| CA | 3093444 A1 | 3/2021 |
| CN | 103460215 A | 12/2013 |

(Continued)

OTHER PUBLICATIONS

Karafili et al "Improving Data Sharing in Data Rich Environments,"2017 IEEE International Conference on Big Data (BIGDATA), pp. 2998 to 3005 (Year: 2017).*

*Primary Examiner* — Luu T Pham
*Assistant Examiner* — James J Wilcox
(74) *Attorney, Agent, or Firm* — Kilpatrick Townsend & Stockton, LLP

(57) ABSTRACT

A policy-controlled access security system for managing access security to electronic agents in cloud based multi-tenant systems includes a client device, a mid-link server, and a web server. A local application running on the client device requests for access to an electronic agent of a remote application of the web server. Policies are determined corresponding to the electronic agent for controlled access to the electronic agent. A token for the electronic agent is correlated with a plurality of tokens for identifying a user application associated with the token. The remote application corresponding to the token from the request is compared with the user application. Based on the comparison an authorization is determined by the mid-link server corresponding to the token for accessing the electronic agent. The policies are enforced on the client device and the access to the electronic agent is provided based on the policies via the web server.

12 Claims, 12 Drawing Sheets

(56) References Cited

U.S. PATENT DOCUMENTS

| | | | |
|---|---|---|---|
| 9,413,749 B2 * | 8/2016 | Mottes | H04L 63/10 |
| 9,571,285 B2 | 2/2017 | Kassaei | |
| 9,722,991 B2 | 8/2017 | Canning | |
| 10,242,362 B2 * | 3/2019 | Burgess | H04L 63/06 |
| 10,454,940 B2 | 10/2019 | Lander | |
| 10,673,861 B2 | 6/2020 | Karunakaran | |
| 10,783,237 B2 * | 9/2020 | Chen | G06Q 10/00 |
| 10,846,390 B2 | 11/2020 | Subramanian | |
| 11,093,500 B2 * | 8/2021 | Gladwin | G06F 16/24545 |
| 11,233,776 B1 * | 1/2022 | Muddapappu | H04L 63/102 |
| 2003/0018497 A1 * | 1/2003 | Luedtke | G06Q 40/08 705/4 |
| 2005/0183143 A1 * | 8/2005 | Anderholm | G06F 11/3438 726/22 |
| 2006/0015933 A1 * | 1/2006 | Ballinger | H04L 63/105 726/10 |
| 2007/0192824 A1 * | 8/2007 | Frank | G06Q 20/145 726/1 |
| 2008/0288648 A1 * | 11/2008 | Schneider | H04L 67/56 709/229 |
| 2009/0158407 A1 * | 6/2009 | Nicodemus | H04L 63/20 726/6 |
| 2009/0183225 A1 | 7/2009 | Malakapalli | |
| 2009/0245500 A1 * | 10/2009 | Wampler | H04M 7/006 379/265.09 |
| 2010/0328076 A1 * | 12/2010 | Kyle | G16H 40/20 340/573.1 |
| 2012/0317624 A1 | 12/2012 | Llorente | |
| 2013/0290434 A1 * | 10/2013 | Bank | G06Q 10/10 709/204 |
| 2013/0346119 A1 * | 12/2013 | LeCompte | G06Q 10/02 705/5 |
| 2014/0108558 A1 * | 4/2014 | Borzycki | G06F 9/543 709/205 |
| 2014/0282919 A1 | 9/2014 | Mason | |
| 2014/0359696 A1 | 12/2014 | Mallia | |
| 2015/0089569 A1 | 3/2015 | Sondhi | |
| 2016/0381021 A1 | 12/2016 | Moore | |
| 2017/0098218 A1 * | 4/2017 | Rios | G06Q 40/08 |
| 2017/0148230 A1 * | 5/2017 | Richard | H04L 67/141 |
| 2017/0237857 A1 * | 8/2017 | Cordell | G06Q 10/06395 379/265.06 |
| 2017/0244695 A1 * | 8/2017 | Lund | H04L 63/083 |
| 2017/0302644 A1 | 10/2017 | Goodwin | |
| 2019/0364020 A1 * | 11/2019 | Wardell | H04L 41/0893 |
| 2019/0373000 A1 * | 12/2019 | Garnett | H04L 63/1416 |
| 2020/0213251 A1 * | 7/2020 | Shah | G06N 20/00 |
| 2020/0336466 A1 | 10/2020 | Goldschlag | |
| 2020/0372382 A1 * | 11/2020 | Trim | G06N 5/043 |
| 2021/0152542 A1 | 5/2021 | Palop | |
| 2021/0367944 A1 * | 11/2021 | Gupta | H04L 67/56 |
| 2022/0199225 A1 * | 6/2022 | Wildenhaus | G16H 20/70 |

FOREIGN PATENT DOCUMENTS

| | | |
|---|---|---|
| JP | 2019153330 A | 9/2019 |
| JP | 2020502616 A | 1/2020 |

* cited by examiner

US 11,553,008 B1

ELECTRONIC AGENT SCRIBE AND COMMUNICATION PROTECTIONS

BACKGROUND

This disclosure relates in general to electronic agent security systems and, but not by way of limitation, to policy-controlled access security and token management for electronic agents among other things.

Popular electronic agents used by organizations boost innovation, improve communication, and develop efficient processes for businesses. Various software tools and mobile applications of the electronic agents are available nowadays that provide enhanced functionalities crucial for communication use of the organizations. However, the electronic agents accompany privacy issues, abuse of recording, sharing and access rights, and involvement of unauthorized third parties that might raise security concerns for the organizations. The misuse of transcript function, unwarranted communication, and access to extremely confidential and sensitive information are some of the major problems faced by the organizations while using the electronic agents.

Unrestricted use of the electronic agents by employees may pose threat to the security and integrity of the organizations. The ill-use of the electronic agents may result in legal matters, disputes, and assault leading to ransom or public acknowledgement. This may in turn cause financial loss and reputational damage to the organizations.

SUMMARY

In one embodiment, the present disclosure provides a policy-controlled access security system for managing access security to electronic agents in cloud based multi-tenant systems includes a client device, a mid-link server, and a web server. A local application running on the client device requests for access to an electronic agent of a remote application of the web server. Policies are determined corresponding to the electronic agent for controlled access to the electronic agent. A token for the electronic agent is correlated with a plurality of tokens for identifying a user application associated with the token. The remote application corresponding to the token from the request is compared with the user application. Based on the comparison an authorization is determined by the mid-link server corresponding to the token for accessing the electronic agent. The policies are enforced on the client device and the access to the electronic agent is provided based on the policies via the web server.

In an embodiment, a policy-controlled access security system for managing access security to electronic agents in a cloud based multi-tenant system. The policy-controlled access security system includes a client device, a mid-link server, and a web server. The client device includes a local application. The local application is configured to execute on the client device and is further configured to provide a request for access to an electronic agent of a remote application run on a remote instance of a web server. A token is required by the electronic agent. A policy store includes a plurality of policies. The plurality of policies specifies controlled access to a plurality of electronic agents of a plurality of remote applications. The controlled access includes restrictive use of a functionality associated with the electronic agent, access to shared content, and/or access to the electronic agent by a plurality of end users. The mid-link server coupled to the client device includes a confidentiality enterprise agent configured to determine a set of policies from the plurality of policies corresponding to the electronic agent. A correlator of the mid-link server configured to correlate the token with a plurality of tokens in the policy store to identify a user application associated with the token. The plurality of tokens of the plurality of remote applications are associated with the plurality of policies. The remote application corresponding to the token from the request is compared to with the identified user application. An authorizer of the mid-link server is configured to authorize the token for accessing the electronic agent based on the comparison. A router of the mid-link server is configured to enforce the set of policies on the client device. The access to the electronic agent is provided based on the set of policies via the web server.

In another embodiment, a method for policy-controlled access security to electronic agents in cloud-based multi-tenant systems. In one step, a local application running on a client device requests access to an electronic agent of a remote application run on a remote instance of an agent server. A token is required by the electronic agent. A set of policies from a plurality of policies corresponding to the electronic agent is determined. The plurality of policies specifies controlled access to a plurality of electronic agents of a plurality of remote applications. The controlled access includes restrictive use of a functionality associated with the electronic agents, access to shared content, and/or access to the electronic agent by a plurality of end users. The token is correlated with a plurality of tokens in a token repository for identifying a user application associated with the token. The remote application corresponding to the token from the request is compared with the identified user application. An authorization by a mid-link server corresponding to the token for accessing the electronic agent is determined based on the comparison. The set of policies is enforced on the client device. The access to the electronic agent is provided based on the set of policies via the agent server.

In yet another embodiment, a policy-based access system for managing secure access to electronic agents in cloud-based multi-tenant systems, the policy-based access system comprising a plurality of servers, collectively having code for:

requesting from a web server by a client device access to an electronic agent of a remote application run on a remote instance of an agent server, wherein a token is required by the electronic agent;

determining a set of policies from a plurality of policies corresponding to the electronic agent, wherein: the plurality of policies specifies controlled access to a plurality of electronic agents of a plurality of remote applications, and the controlled access includes restrictive use of a functionality associated with the electronic agents, access to shared content, and/or access to the electronic agent by a plurality of end users;

correlating the token with a plurality of tokens in a token repository for identifying a user application associated with the token;

comparing the remote application corresponding to the token from the request with the identified user application;

determining an authorization by a mid-link server corresponding to the token for accessing the electronic agent based on the comparison;

assigning a plurality of privileges to the client device for accessing the electronic agent based on the set of policies, wherein the set of policies specifies the plurality of privileges associated with the controlled access to the electronic agent;

enforcing the set of policies on the client device; and
providing the access to the electronic agent based on the set of policies via the agent server.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
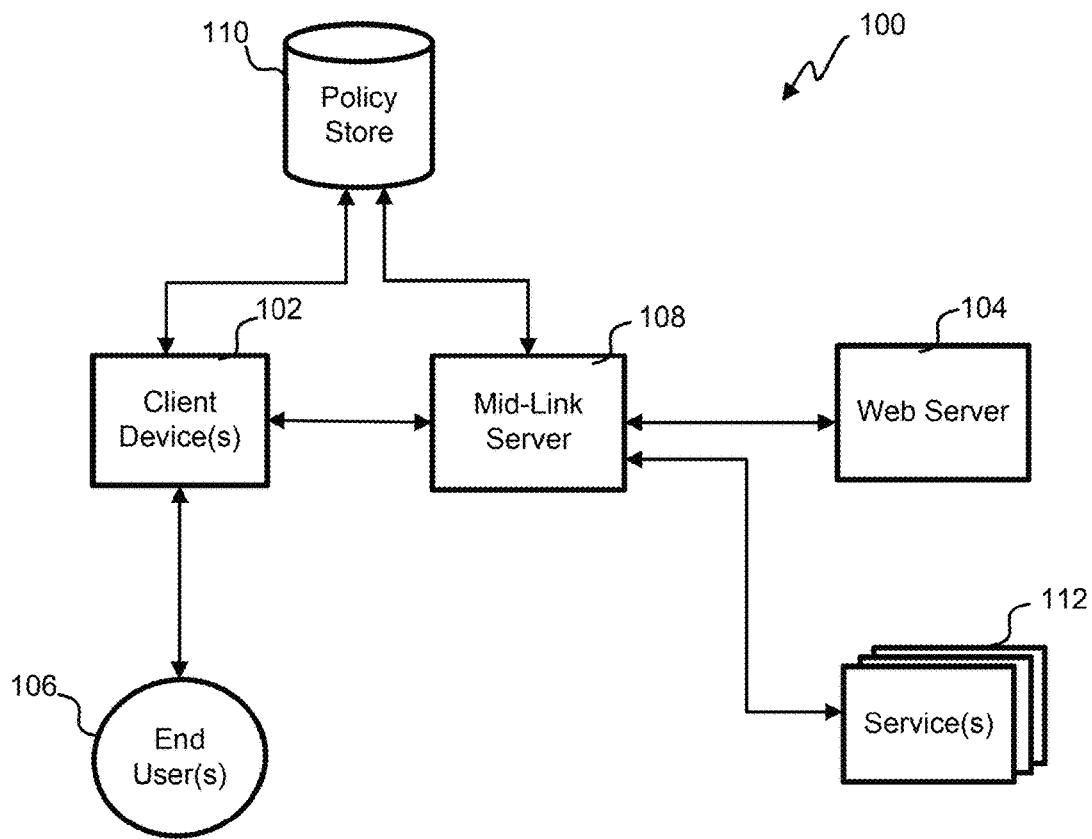
FIG. 1 illustrates a block diagram of a policy-controlled security system.

Referring first to FIG. 1, a block diagram of a policy-controlled security system 100 is shown. The policy-controlled security system 100 is a policy-controlled access security system for electronic agents. The policy-controlled security system 100 includes client device(s) 102, a web server 104, end user(s) 106, a mid-link server 108, a policy store 110, and services 112. The client device(s) 102 such as smartphones, tablets, PCs, and any other computing devices communicate with the web server 104 over encryption links using the internet. The client device(s) 102 may be secured by using the mid-link server 108 that remotely hosts a secured software environment. The client device(s) 102 run any popular operating system (OS) such as Windows™, iOS™, Android™, Linux, set top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™. The operating system of the client device(s) 102 runs third party apps. The policy store 110 holds policies for each client device 102 and the mid-link server 108.

The client device(s) 102 use content and processing from the web server 104 (or an agent server) including content sites for example, web sites, streaming content, etc. and the services 112 for example, SaaS tools, databases, cloud service providers, etc. Under policy control, the client device 102 routes some interaction to the mid-link server 108 that hosts a controlled software environment for each end user 106 to securely interact with the web server 104 and the services 112 or enterprise tools in a way limited by specified policies. For example, policies may specify configuration settings of the electronic agents that are used on the client device 102 while using the controlled software environment by remote access. The electronic agents are part of the services 112 for example, collaboration services such as online meeting, chatbots, web conferences, webinars, chatting platforms, calling, chatting, and/or messaging applications. The policies for electronic agents specify a manner in which the electronic agents are to be used at the client device(s) 102.

The policies control the manner in which the electronic agents are accessed at the client device 102. Other policies may enable certain software applications or interaction on the client device 102 while physically on premise and allowing different software applications or interaction while working in the field or at home away from the enterprise premises. In one example, a policy on the client device 102 for accessing a meeting application using a token on a remote software environment may be disabled for some or all applications when accessed from a mobile of the end user 106 during offline hours. In some cases, enforcement of the policy depends on whether the client device 102 is within the enterprise or away from the office. Tokens are required by the electronic agents to provide access to the end user 106 using various token protocols. The token protocols for example may be but not limited to, Open Authorization (OAuth), Federated Identity Management (FIM), OpenID Connect (OIDC), Security Access Markup Language (SAML), Web Services Federation (WS-Fed), and Single Sign On (SSO) provide communication along a network in an encrypted manner. These token protocols are used for establishing secure links between the local applications on the client device(s) 102 and electronic agent sites on the web server 104. An example of the policies is illustrated in Table 1 discussed below.

Table 1 below illustrates a list of policies for the electronic agents, functionalities of the electronic agents, a list of remote applications of the electronic agents and the corresponding tokens. The table is stored in the policy store 110.

TABLE 1

| Policies | Electronic Agent | Functionality | Remote Application | Token |
|---|---|---|---|---|
| Policy 1 | Meeting | Recording, sharing, invite allowed | Application A, B, C | Tokens allowed |
| Policy 2 | Chatbot | Sharing allowed, access to calendar blocked | Application A | OAuth tokens allowed |
| Policy 3 | Calendar | Access to calendar allowed | Application B | SAML, SSO, and Open ID tokens allowed |
| Policy 4 | Webinar | Official invitees, allowed, sharing and recording blocked | Application D, E, F | Tokens allowed |
| Policy 5 | Online Conference | Sharing allowed, recording blocked | Application X | Tokens allowed |
| Policy 6 | Call | Only official invitees allowed | Application B | Tokens allowed |
| Policy 7 | Chat | Only within team members allowed, sharing of official files allowed | Application B | OAuth tokens only allowed |
| Policy 8 | Messaging | Only within team members, sharing allowed | Application A | Tokens allowed |

As illustrated in Table 1, the policies are specified with respective electronic agents, tokens, remote applications, and functionalities. Each policy specifies restrictive use of the functionalities associated with the electronic agents and authorization of the tokens corresponding to the remote applications. For example, policy 1 allows recording, sharing, and sending invites using one of the applications A, B, or C for organizing a meeting. Tokens from the applications A, B, and C are authorized for accessing the electronic agents. Similarly, policy 2 allows sharing content while using chatbots through OAuth tokens.

However, access to calendar by the chatbots is blocked under the policy 2. Application A is allowed to be used for chatbots and the tokens from the application A are authorized for accessing the electronic agents. Another example, setting up calendars using application B and the corresponding tokens allows access to personal calendars under policy 3. SAML, SSO, and Open ID tokens are allowed. Webinars may be set up using one of the applications D, E, or F and their corresponding tokens. Official invitees are allowed in the webinar. Sharing and recording of content is blocked as per policy 4. Policy 5 allows setting online conferences using application X, sharing content is allowed, recording during the online conference is blocked. Tokens corresponding to the application X are allowed. Policy 6 enables setting up calls with official invitees using application B and corresponding tokens. Policy 7 allows chat sessions using application B with team members only. Tokens other than OAuth tokens are not authorized. The sharing of official files is allowed. Policy 8 allows messaging using application A with only team members. The sharing of content is allowed. Tokens corresponding to the application A are allowed.

These policies are set based on a number of factors. The factors include a tenant/enterprise of the client device 102, a type of network connection of the client device 102, confidentiality associated with the functionality like sharing, recording and inviting, the remote applications for the electronic agents, user logs, types of the client device(s) 102 such as phone, laptop, mobile, and/or designation of the end user(s) 106 such as President, Manager, Analyst etc. The policies are set by an administrator of the organization of the end user 106 based on the factors. In another embodiment, the policies may be set by the end user 106 of the client device 102. The remote applications that have been allowed access using the tokens are authorized for use by the end user 106.

By way of an example, a president may have access to sharing and recording the content during a meeting with employees via a remote application. By way of another example, a manager organizing a webinar may be assigned sharing rights based on a policy. Sharing content using personal mobile phones of employees may not be allowed during messaging sessions based on the policy. Based on a confidentiality of the file, sharing of the file may not be allowed based on the policy. User browsing activities from user logs and a type of personal Virtual Private Network (VPN) connection used at the client device 102 influences the policies of the electronic agents. Enterprises may also set up restrictions on use of specific remote applications based on organization policy. For example, an application A may be allowed but another application B might not be allowed as per the organization policy.

The web server 104 includes the electronic agent sites such as meeting application web sites, conferencing web sites, content sites such as web sites, streaming content, or application web sites etc. in order to provide services of the electronic agents, and/or provide content to the client device(s) 102. The web server 104 also allows the end user(s) 106 of the client device(s) 102 to upload and download content from the content sites. The web server 104 also allows the end user(s) 106 of the client device(s) 102 to download the remote application of the electronic agent. The web server 104 is in communication with the client device(s) 102 via the mid-link server 108 over the internet. In another embodiment, the policy-controlled security system 100 includes one or more application servers (not shown) for providing dynamic content to the client device(s) 102.

The mid-link server 108 for the work systems resides as a "man-in-the-middle" intentionally take over some or all: processing, application execution and/or content sites at the web server 104 and the services 112 interaction. The remote software environment is hosted by the mid-link server 108 for a policy-controlled experience using the policy store 110 for authorization and control. For example, the electronic agent sites at the web server 104 may have certain functionalities like recording, or sharing content disabled, filtered or modified by the mid-link server 108 so that the client device(s) 102 behaves differently than if it were to directly connect to the content sites of the web server 104. For example, a policy may specify connection using a token via the web server 104 for a meeting application allowed by the policy.

Some embodiments have the policies that selectively direct tokens to the mid-link server 108 based on a label or tag of the content to be discussed during a session initiated using the electronic agents. A classifier may identify the label or the tag of the content. For example, the content may be classified as restricted, critical, secret, or public based on a type of the content. For example, a meeting application using files from a zipped folder may be confidential and restricted. By way of another example, the content sharing may be allowed for the webinar application during office hours or at an official PC but may be restricted on the mobile or at a remote location from the office. Similarly, the functionality of sharing content may be restricted for the meeting application based on the policies. The tokens may not be allowed for accessing a confidential document using an unauthorized remote application.

The policy store 110 is a database that includes predefined policies for authorizing the tokens to access the electronic agents. The policy store 110 also includes the remote applications and the local applications associated with the policies. The remote applications include electronic agent applications such as meeting applications, webinar application, web conference applications, chatbots apps and third party applications such as social media, emails, calendar, chats or streaming applications. The local applications are used to access the remote applications using the tokens. For example, a policy associated with a calendar application specifies use of authorized access tokens. The policies may be predefined by the enterprise or the client device 102. The policies may be modified based on user requirements. Modified policies are also stored in the policy store 110 by the administrator or the enterprise.

In an embodiment, the policy-controlled security system 100 allows multiple-tenants in different domains to communicate with the web server 104 over the internet. The policy-controlled security system 100 allows multiple tenants or enterprises (not shown) to all use the same network separated by domain or some other logical separation. The policy-controlled security system 100 manages tokens and policies used to access electronic agents in cloud-based multi-tenant system (s) (not shown). Encryption, leased/encrypted tunnels, firewalls, and/or gateways can be used to keep the data from one enterprise separate from other enterprises. Each client device 102 can communicate with the web server 104 for the services 112 and storage using the internet. The mid-link server 108 provides multi-tenancy control, policies and routing for each domain.

Figure 2:
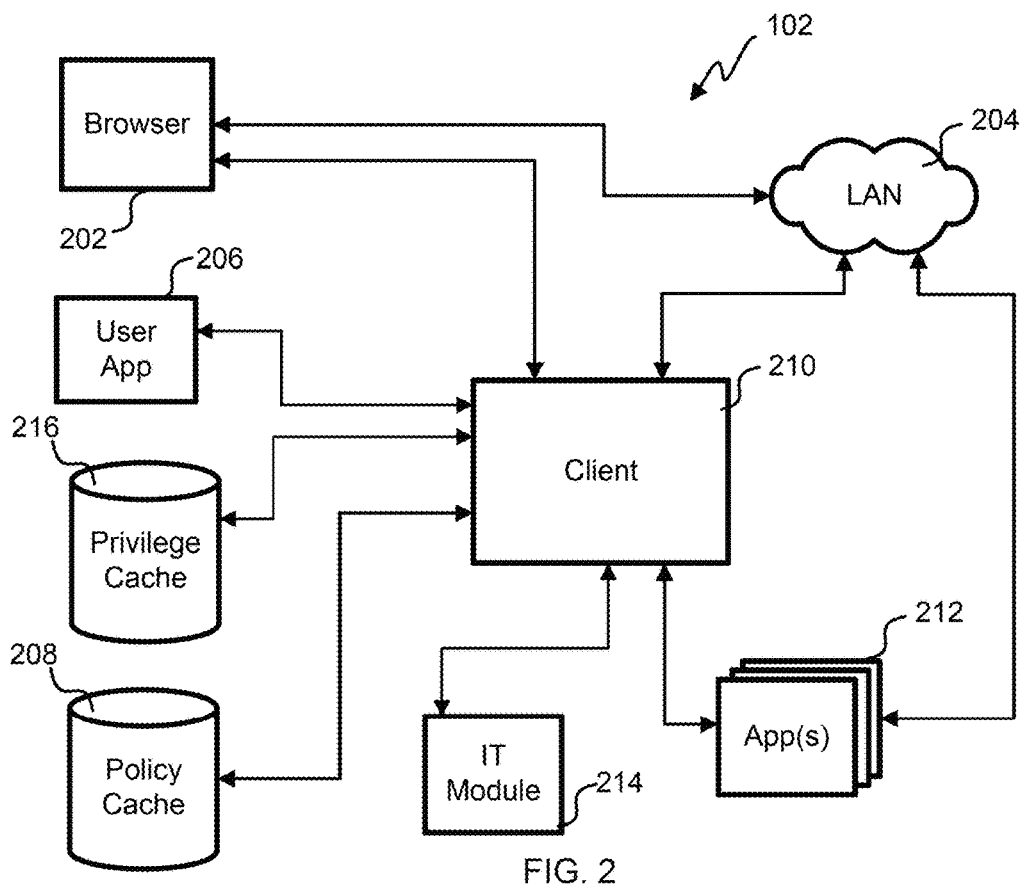
FIG. 2 illustrates a block diagram of a client device.

Referring specifically to FIG. 2, a block diagram of the client device 102 is shown. This embodiment of the client device 102 uses a client 210 to establish connections with the mid-link server 108. A user app 206 exclusively uses the client 210 to communicate with the mid-link server 108 to maintain security for operation of the user app 206.

Display of the remote software environment is performed by the user app 206. In an embodiment, the user app 206 includes a local application. The entire interface of the remote software environment could be displayed, or the interface of a single user app could be displayed. Several instances of the user app 206 could display several user app interfaces respectively. Multiple instances of the user app 206 could have several remote software environments respectively running. For example, a user of Chromebook™ may have one user app 206 running iOS™ and another user app 206 running Linux™ with the ability to switch back-and-forth in full-screen or windowed mode. The user app 206 is a web browser or a video player in some embodiments merely displaying a stream of video.

The client 210 may apply policies that are stored locally in a policy cache 208 to the client device 102. The policy cache 208 is populated with the policies from the policy store 110 that are relevant for the respective client device 102. As conditions change, the policies that are in effect could also change. For example, use of tokens associated with the camera/video sensors based applications for recording meetings on the client device 102 could be disabled inside the office or factory, but re-enabled outside of a geofenced area. By way of an example, artificial intelligence (AI) devices may be required to be disabled inside the geofenced area based on the policies. The AI devices include AI speakers, AI entry access, or IoT devices. Non-compliance with recording or sharing content during a meeting as per the policies is identified which enables alerts to be generated and flagged to the end user 106 and/or other participants/users of the meeting. Certain features, functions or applications might be disabled by a specific policy for the tokens until certain conditions exist. For example, there may be a policy that restricts tokens for accessing meeting apps on the mobile of the end user 106 during offline hours or when using unrecognized Virtual Private Network (VPN). Further, another policy allows use of the tokens for accessing calendar applications from the client device 102. The client 210 supports the user app 206, apps 212 running on the client device 102 or a browser 202 in communication with the mid-link server 108 via a Local Area Network (LAN) 204.

A privilege cache 216 stores privileges associated with the policies. These privileges allow the end user 106 to assign access rights to other participants of the electronic agents based on the policies. The access rights to various functionalities of the electronic agents include recording, sharing content, inviting participants, and/or use of AI devices in a vicinity of the participants. The privilege cache 216 includes a mapping of policies, functionalities of the electronic agents and the corresponding privileges.

The user app 206 is used as an interface for analyzing the alerts, providing feedback and assigning the privileges to the participants accessing the electronic agents. The user app 206 may be used to assign privileges to functionalities like sharing, recording, sending invites to participants based on the policy associated with the remote application of the electronic agent. The interface may be a graphical user interface (GUI) for presenting the electronic agents to the end user 106 of the client device 102.

An Information Technology (IT) module 214 provides an interface for an administrator or IT staff of an organization of the end user 106 for analyzing log reports, status of the tokens and assigning policies to the client device(s) 102. The administrator of the enterprise reviews the policies, the tokens, established connections, and/or local applications and the remote applications. The administrator may also modify the policies by updating and/or upgrading the policies using the IT module 214.

Figure 3:
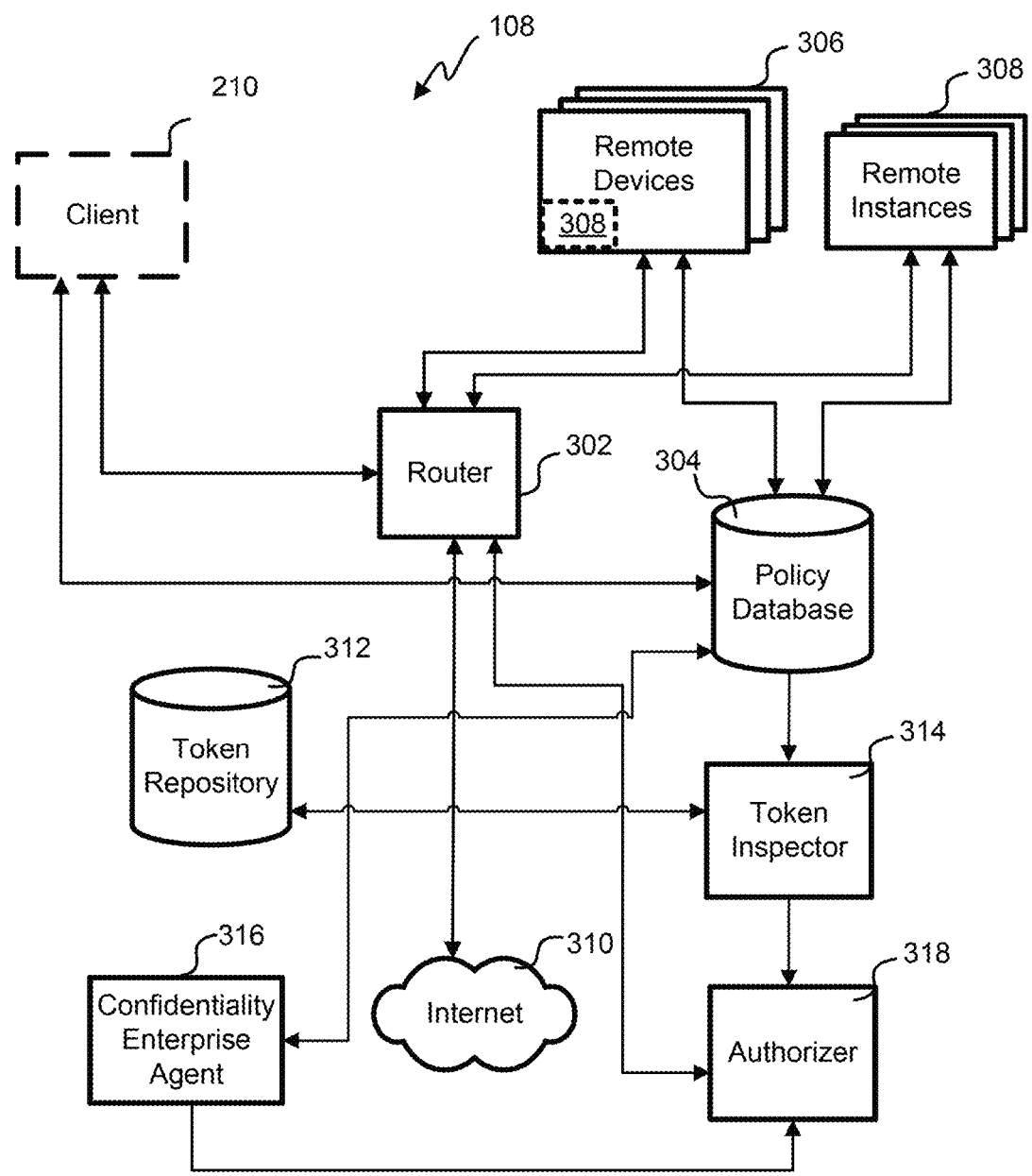
FIG. 3 illustrates a block diagram of a mid-link server is shown that hosts software environments that the client device(s) remote into.

Referring next to FIG. 3, a block diagram of the mid-link server 108 is shown that hosts software environments that the client device(s) 102 remote into. Traffic is passed with the Internet 310 accessed through a router 302 to enable the various depicted components of the mid-link server 108 to communicate with each other, specifically, the client 210, a policy database 304, remote devices 306, remote instances 308, a token repository 312, a token inspector 314, a confidentiality enterprise agent 316, and an authorizer 318. Dashed line used in the figure for representing the client 210 indicate that the client 210 is not a part of the mid-link server 108 and is used in the figure for illustrating inputs/outputs from the client 210. Similar representations used in other block diagrams signify the same illustration.

The mid-link server 108 hosts many different enterprises and domains keeping usage from their different client device(s) 102 separated. In other cases, the mid-link server 108 could be dedicated to a particular enterprise and hosted inside their network or the LAN 204 or with a third party hosting service. In any event, each remote instance 308 is dedicated to a client device 102 for use, although an Information Technology (IT) staff have access to update software, apply policies, make configuration changes, modify admin settings and rights, etc. to maintain the remote instance 308. The client 210 connects with the client device(s) 102 over the Internet 310 in digitally segregated connections.

In an embodiment, the remote devices 306 may be physical remote devices 306 and the remote instances 308 may be virtual-machine remote instances 308. Both the physical remote devices 306 and the virtual-machine remote instances 308 are supported to run software environments. For example, the physical remote devices 306 may be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in a secure, controlled and potentially high performance instantiations. The remote instances 308 host content sites, websites or streaming content for the client device(s) 102. The router 302 provides communication between the client 210 and the remote instances 308. The router 302 allows the access or denial of the tokens based on the communication from the token inspector 314 before the token is used at the remote instances 308.

The remote devices 306 are physical hardware that hosts the remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end user 106 to control the remote instance 308.

The policy database 304 includes a list of policies for setting up an access security link for the electronic agents between the client device 102 and the remote instances 308 using authorized tokens. The policy database 304 also includes a list of authorized applications based on which the connection with the remote instances 308 is established. The policy database 304 includes the policies from the policy store 110. The token and the application to be used are matched within the list of policies and their corresponding electronic agents and remote applications for establishing the connection. The policies are set by the administrator of the enterprise. By way of an example, the tokens of the calendar application may be allowed, and the tokens of social media applications may not be allowed based on the policies set by the enterprise. In other embodiments, these policies are further modified based on the new policies or requirements of the enterprise. For example, one of a social media application might be allowed based on the modified policy. Usage history of the functionalities of the electronic agents further influence the modification of the policies associated with the tokens. For example, based on a misuse of the functionality of sharing content in the meeting, the policy may be modified to raise alert and/or prevent such users from the meeting. By way of another example, the applications may be re-authorized by the administrator based on receiving a re-authorization request from the end user 106 regarding a denial of the token for an application or a functionality being disabled according to the policy.

The token repository 312 includes a database of the tokens either authorized or restricted by the administrator or the enterprise/tenants of the end user 106 of the client device 102 for accessing the electronic agents. The token repository 312 includes a list of the tokens from the policy database 304 which is categorized by the token inspector 314 based on their respective policies.

The token inspector 314 retrieves the policies corresponding to the tokens and the remote applications from the policy database 304 to monitor the tokens. The token inspector 314 categorizes the tokens in the token repository 312 based on the policies set by the administrator or the enterprise. The token inspector 314 monitors each token, matches the token with the list of tokens in the token repository 312, correlates the token with the list of the tokens in the policy database 304, and identifies the corresponding applications, electronic agents, functionalities, and policies associated with the token. The token inspector 314 further determines whether the token is authorized to be used according to the policy. The authorization on the token is provided to the authorizer 318 for further analysis.

The token inspector 314 further keeps a log of tokens each time the tokens are used for the electronic agents. A compliance with the respective policies is checked in order to track any compromise or misconduct in complying the policy. For example, there may be malicious or unidentifiable tokens for the electronic agents that creates the non-compliance. Unidentified, unauthorized or malicious tokens are flagged to the IT module 214 for re-authorization. For example, the token inspector 314 determines a threat associated with the token, categorizes the token as malicious for the client device 102, and flags the client device 102 and/or the IT module 214 for inspection and re-authorization.

The token inspector 314 identifies and tracks the tokens by inline (i.e. by watching and inspecting traffic), via management connection monitoring (i.e. watching what administrators do), by Application Programming Interface (API) application monitoring (i.e. looking specifically for authorizations) and by performing behavioral analysis to identify new connection.

The confidentiality enterprise agent 316 determines the policies for the electronic agents based on the confidentiality of, enterprise content, user logs, user designation, and network connections used. The electronic agents are requested by the end user 106 of the client device 102. The confidentiality enterprise agent 316 retrieves the policies from the policy database 304 and provides the policies based on the electronic agents to the authorizer 318. The confidentiality enterprise agent 316 determines the policies using the list of policies from the policy database 304. The confidentiality enterprise agent 316 further assigns privileges to the client device 102 based on the policies. Audit of the AI devices within a threshold distance from the users of the electronic agents is performed to identify any non-compliance with the policies. The AI devices may be disabled based on the policies. Modification of the policies is performed by the administrator from the IT module 214 and applied using the confidentiality enterprise agent 316.

The authorizer 318 receives the token authorization from the token inspector 314 and the policies determined by the confidentiality enterprise agent 316 to correlate the policies and the token to authorize the use of the tokens and the remote application on the client device 102 based on the policy. Based on the authorization, the authorizer 318 allows the token to be used by the user app 206 at the router 302 for accessing the electronic agents from the remote instances 308.

Figure 4:
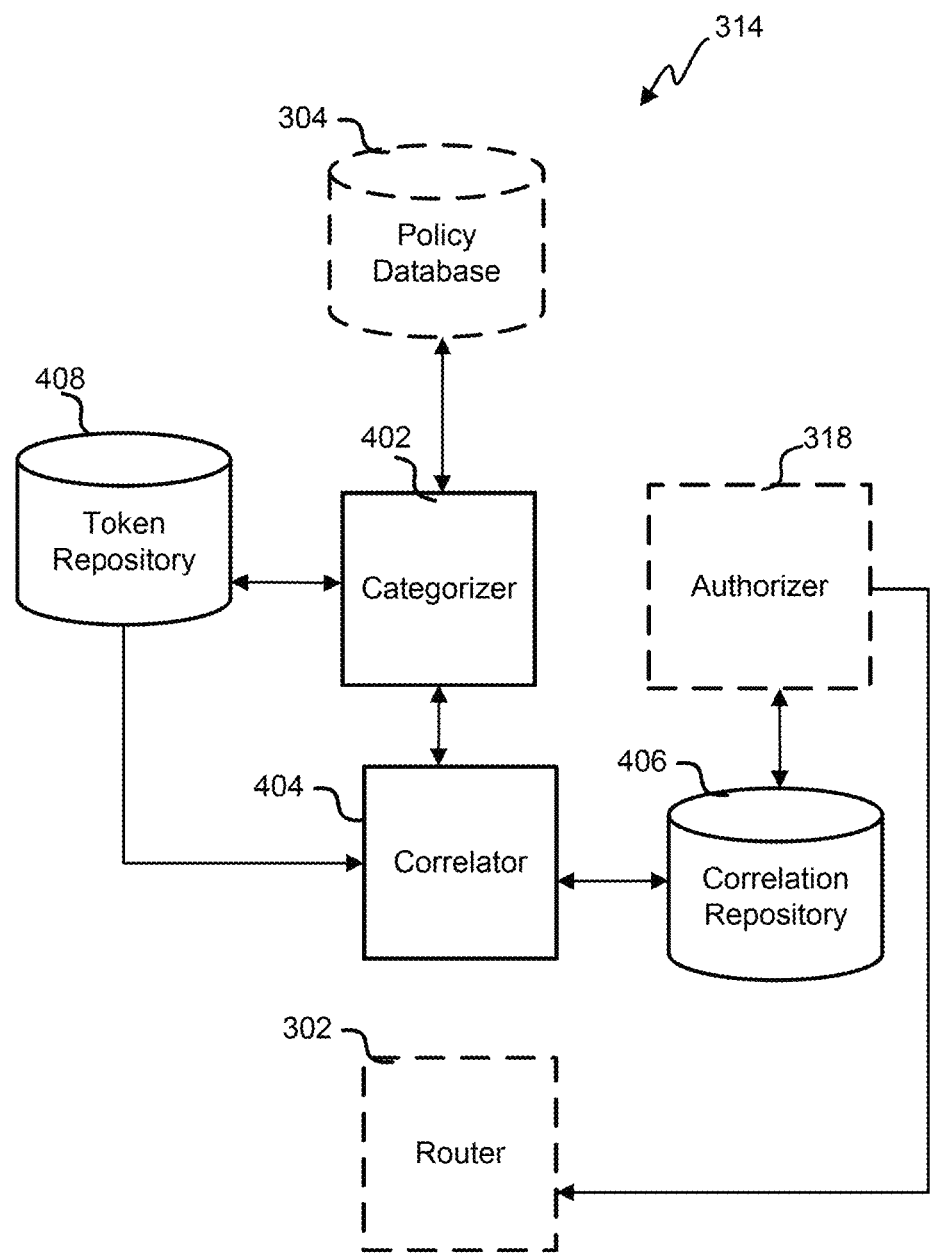
FIG. 4 illustrates a block diagram of a token inspector configured to categorize, correlate, and authorize the tokens.

Referring next to FIG. 4, a block diagram of the token inspector 314 configured to categorize, correlate, and authorize the tokens is shown. The token inspector 314 includes a categorizer 402, a correlator 404, a correlation repository 406, and a token history database 408.

The categorizer 402 receives the list of policies for the tokens as set by the administrator or the enterprise/tenants from the policy database 304. The categorizer 402 uses the list of policies to categorize each of the tokens in the token repository 312. The tokens are categorized into multiple categories based on their respective policies.

The tokens that are new and do not have a past usage history are categorized as new. New policies may be set for the new tokens. The categorizer 402 flags an alert via the router 302 to the IT module 214 or to the end user 106 of the client device 102 for authorization of the new tokens. The categorization is performed using machine learning algorithms or fuzzy logic. The categorizer 402 continuously monitors and updates the categories of the tokens based on a usage of the tokens acquired from the user logs within the token history database 408.

The correlator 404 uses the list of categorized tokens in the token repository 312 to match a token received from a request of the client device 102 with the categorized tokens in the list. If the token is found matching within the list of categorized tokens, the policy associated with the matched token, the corresponding electronic agent and the application for which it is used are identified. The application of the token from the request is compared with the application of the matched token in the list. If the application is matched in the list, then the authorization of the token is determined. If the token is determined as authorized as per the policy of the token, the token is allowed to be used. If the token is determined as unauthorized, the token is reported for re-authorization to the IT module 214 and prevented access to the electronic agent. Authorization information of the tokens is stored in the correlation repository 406 for further analysis.

The correlation repository 406 is a database for the correlated tokens. After being matched with the list of categorized tokens in the correlator 404, the authorization information of the tokens is stored in the correlation repository 406. The authorizer 318 retrieves the authorization information of the tokens from the correlation repository 406 for authorizing the use of the tokens for the electronic agents.

The token history database 408 stores the usage history of the tokens acquired from logs of the client device(s) 102. The usage history also includes administrator reports and user reports. The administrator reports include information on blocked tokens, re-authorized tokens or unidentified tokens obtained from the administrator. Also, information on the tokens from the client device 102 and other data sources such as blogs, websites and social media are incorporated in the user reports. The usage history is useful in categorizing and identifying the tokens. The usage history is shared with the IT module 214 via the router 302 for further analysis.

Figure 5:
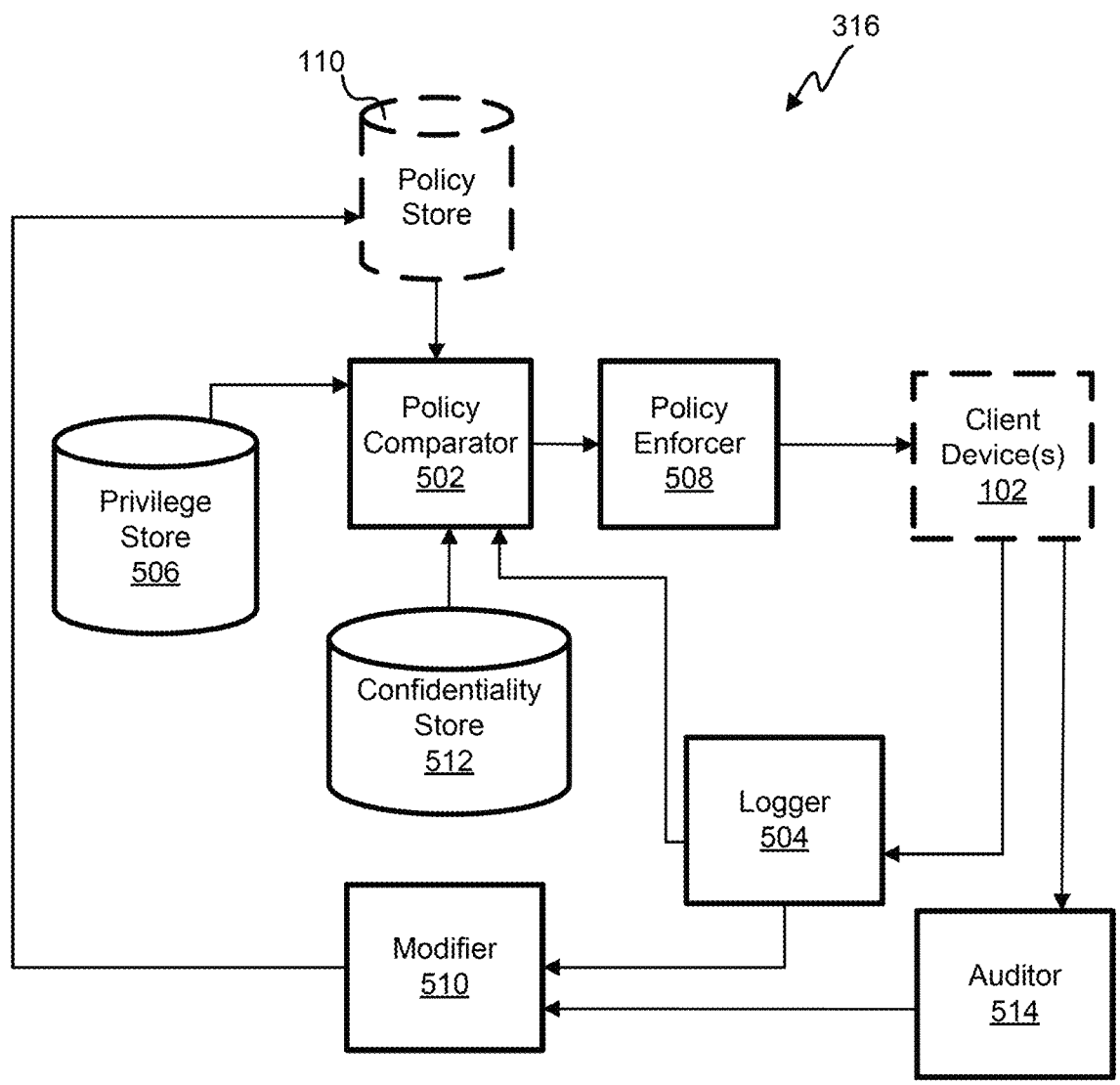
FIG. 5 illustrates a block diagram of a confidentiality enterprise agent configured to determine policies for electronic agents.

Referring next to FIG. 5, a block diagram of the confidentiality enterprise agent 316 configured to determine the policies for the electronic agents is shown. The confidentiality enterprise agent 316 includes a policy comparator 502, a logger 504, a privilege store 506, a policy enforcer 508, a modifier 510, a confidentiality store 512, and an auditor 514.

The policy comparator 502 receives the policies for the electronic agents from the policy store 110 and confidentiality information from the confidentiality store 512. The confidential information includes confidentiality of content to be shared while accessing the electronic agents, user designation, enterprise policies, and/or network connections to be used. The confidentiality information is correlated with the set of restrictions in the functionalities set by the policies. Based on the correlation, policies are identified corresponding to the electronic agent requested by the client device 102. For example, based on the enterprise policy of restricting use of recording functionality by participants or restrictive use of an unauthorized VPN connection by the participants, the policies are identified. Log reports of past usage of the electronic agents from the logger 504 further influence the selection of the policies. The determined policies are provided to the policy enforcer 508 for implementing the policies at the client device 102.

The policy comparator 502 further identifies privileges associated with the determined policies from the privilege store 506. The privilege store 506 includes a mapping of the policies and their respective privileges. The privileges are pre-defined by the administrator of the enterprise based on the enterprise policies. For example, the privileges may be assigned to the end user 106 of the client device 102 to provide access rights for sharing the content to the other participants while using the electronic agent. Another example, where the policy may specify privileges to all the participants to access the content while using the electronic agent. The policy comparator 502 further matches each of the tokens used by the application of the electronic agent at the client device 102 within a token mapping list stored in the policy store 110. After matching the tokens, their respective policies or the modified policies are identified from the token mapping list. A comparison output is generated based on the comparison of each token with the respective policy and the associated privileges are provided to the policy enforcer 508.

The policy enforcer 508 identifies any compliance related issues with the past and current tokens based on the comparison output and enforces the policies to the client device 102. The policy enforcer 508 further assigns the privileges associated with the policies to the end user 106 of the client device 102.

The logger 504 is a repository of the log reports of the tokens and functionalities used at the client device(s) 102. The logger 504 also stores past log reports of policies implemented on the client device(s) 102. The logger 504 stores events such as sharing, recording, inviting, or applying privileges while accessing the electronic agents. For example, the log reports include sharing of content by participants, unauthorized participant barging into a session of the electronic agent or unauthorized or authorized recording by the participants. The logger 504 continuously monitors the tokens used by the applications of the electronic agents at the client device(s) 102 and gathers log data from the client device(s) 102. The log reports are provided to the IT module 214 for further analysis. The log reports are provided to the policy comparator 502 for selecting appropriate policies based on the log data.

The auditor 514 identifies any non-compliance with the functionalities associated with the electronic agents. The auditor 514 performs an inspection regarding the usage of the functionalities while the electronic agent is being accessed. Any non-compliance with the functionalities is against the policies of the electronic agent. The AI devices are identified within a threshold distance from the participants accessing the electronic agent. For example, enabling the AI devices within the threshold distance from the participants may also indicate a non-compliance of the policies. Such incidents of non-compliances are reported in the form of audit reports and provided to the modifier 510. The AI devices may be disabled based on the policies. The modifier 510 changes the policies or flags the incidents to the administrator/IT module 214 for further action.

The modifier 510 processes the log reports from the logger 504 and the audit reports from the auditor 514 to modify the policies if required. For example, the client device 102 may be enforced with updated policies and the corresponding functionalities and the privileges may be updated accordingly. Threat levels associated with the tokens are updated from time to time which require the policies to be updated in the policy store 110. Newly identified or unidentifiable tokens further require re-authorization from the administrator. Use of functionalities like sharing or recording may be subjected to abuse by the participants. The audit reports indicate the abuse of the functionalities or the non-compliance with the policies. The policies then require to be updated after re-authorization. Based on a history of the usage of the functionalities associated with the electronic agents and the remote applications, the policies may be modified and implemented. The modified policies are provided for storage to the policy store 110.

Figure 6A:
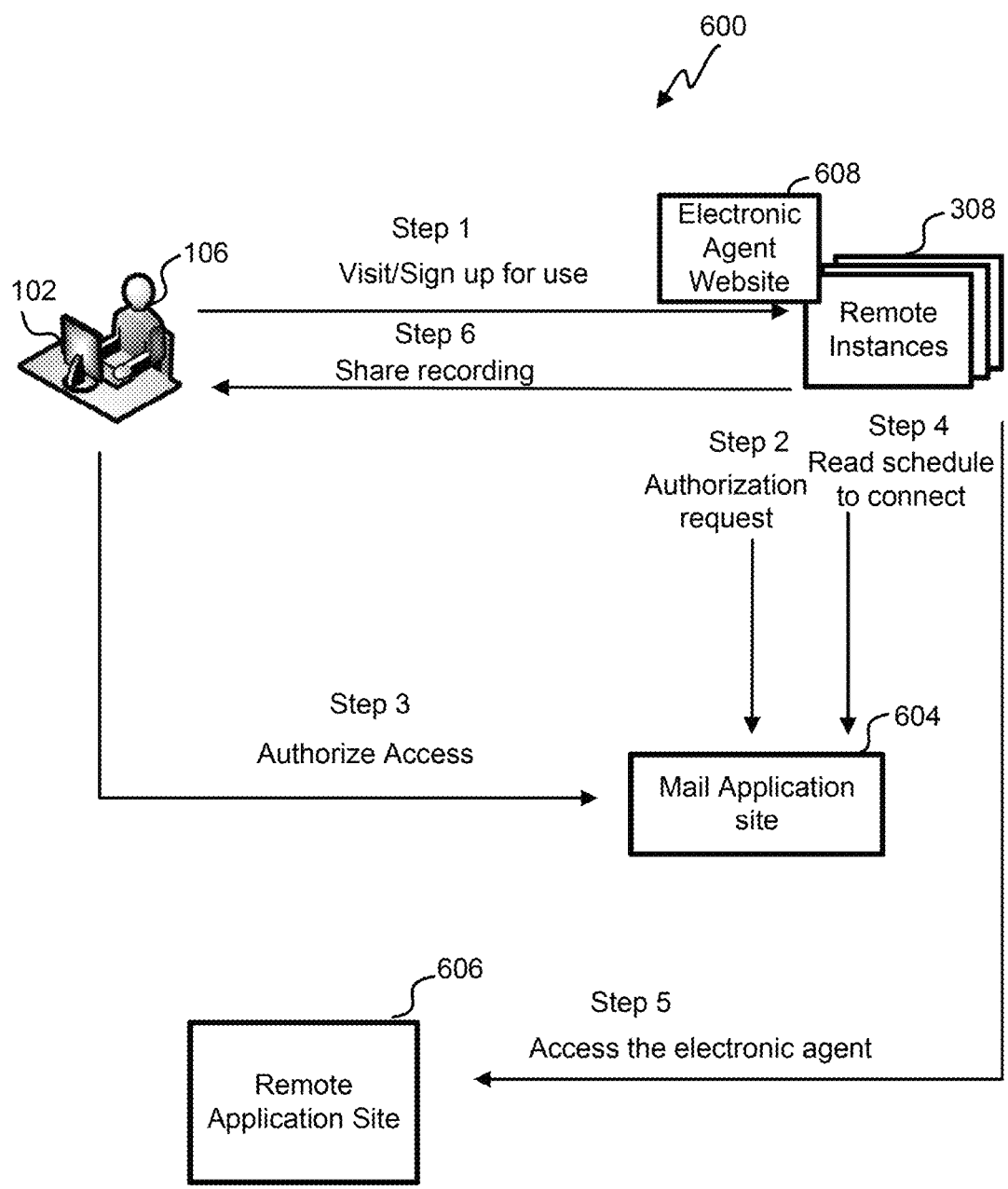
FIG. 6A illustrates a flow diagram of communication between an end user at a client device, and remote instances at a web server for electronic agents.

Referring next to FIG. 6A, a flow diagram 600 of communication between the end user 106 at the client device 102, and the remote instances 308 at the web server 104 for accessing the electronic agents is shown.

At step 1, the end user 106 of the client device 102 requests a remote instance 308 for accessing an electronic agent by signing or visiting an electronic agent website 608 or a software application of the electronic agent. The end user 106 of the client device 102 may use a local application to perform the request by transmitting a token for accessing the electronic agent. A security administrator applies policies to the local application of the end user 106 corresponding to access to the electronic agent. When the end user 106 requests the access to the electronic agent, an audit is performed based on the policy. At step 2, after receiving the request for access to the electronic agent, the electronic agent website 608 sends an authorization request to a mail application site 604. The mail application site may be an email website associated with the end user 106.

At step 3, the end user 106 logs into the email by providing user credentials and performs authorization. The end user 106 is authorized based on the user credentials. At step 4, the end user 106 may read schedules for example, meetings for connecting to the electronic agent associated with the meeting application. The end user 106 is provided access to read the schedules based on a policy associated with the electronic agent. At step 5, the end user 106 connects to a remote application site of the electronic agent to access the electronic agent based on the policy associated with the electronic agent. For example, the end user 106 may join the meeting via a meeting application site based on the policy. The end user 106 accesses the electronic agent via the remote application. Based on the policy associated with the electronic agent, the end user 106 is provided with a recording of the meeting at step 6 from the electronic agent website 608.

Figure 6B:
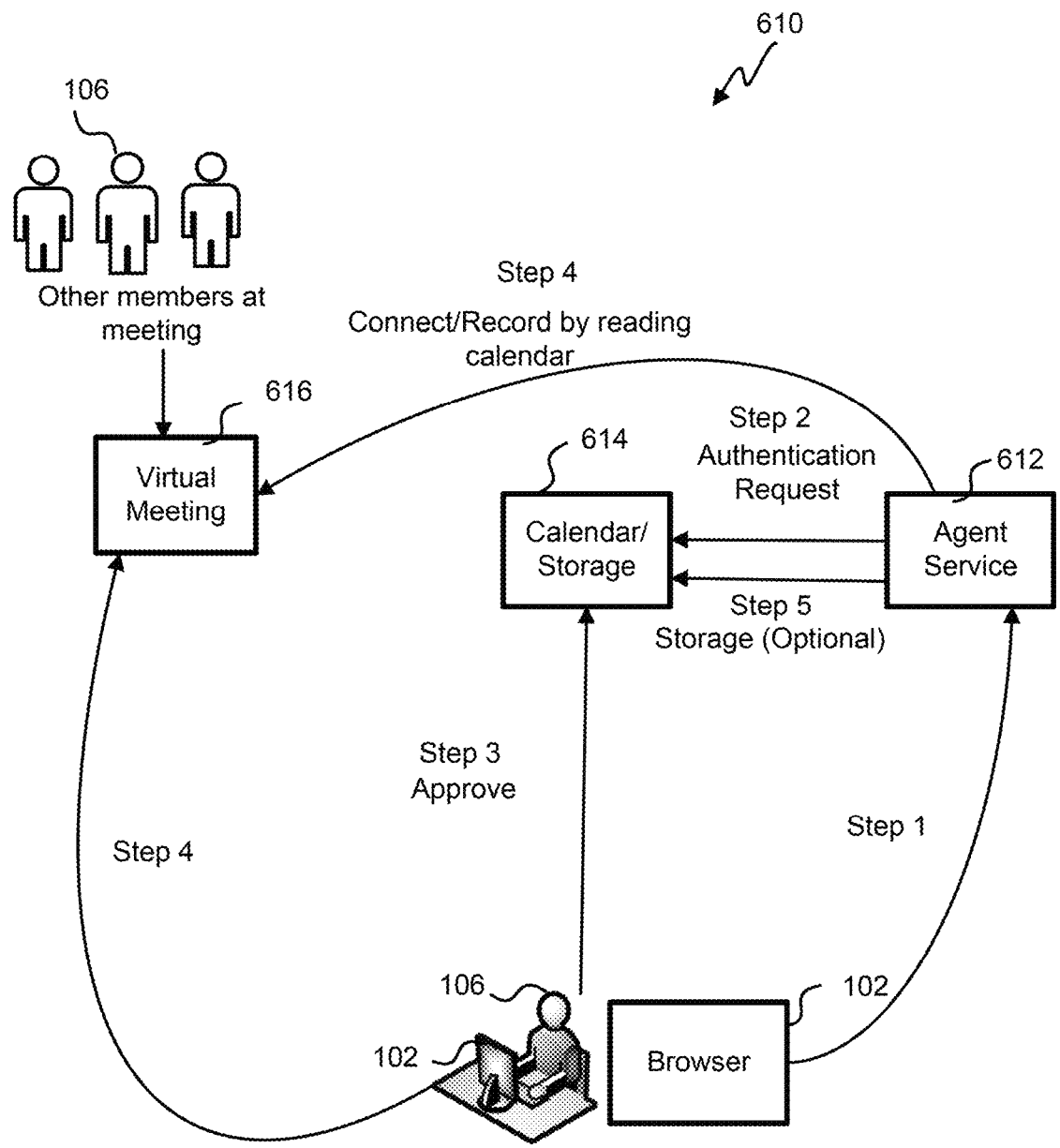
FIG. 6B illustrates a flow diagram of communication between end users attending a meeting from their respective client devices and an agent service.

Referring next to FIG. 6B, a flow diagram 610 of communication between the end users 106 attending a meeting from their respective client devices 102, and an agent service 612 is shown.

While accessing the electronic agent or scribe service, the user will request from one web server 104, the connection and use another service (server to server) where the mid-link server 108 can analyze the interaction with the electronic agent/scribe service. The API service of the policy-controlled security system 100 analyzes administrate traces and connections to applications like calendaring, cloud storage, and email. Therefore, cloud service to cloud service interactions are also tracked and analyzed by the mid-link server 108.

At step 1, the end user 106 of the client device 102 requests the agent service 612 for accessing an electronic agent for a virtual meeting application 616. The end user 106 of the client device 102 may use a local application to perform the request by transmitting a token for accessing the virtual meeting application. At step 2, an authentication of the request of the end user 106 is send to a calendar application 614. The calendar application 614 provides the slot for the virtual meeting by authenticating the request. At step 3, the end user 106 approves the slot provided by the calendar application 614 based on an availability of the end user 106.

At step 4, the end user 106 joins the virtual meeting 616 using the client device 102. The agent service 612 connects the end user 106 to the virtual meeting 616 by reading the calendar from the calendar application 614. Recording may also be allowed by reading the calendar. At step 5, the agent service 612 may allow storage of the interactions and recordings which is optional. Other members 106 also connect to the virtual meeting 616 similarly from their respective client devices 102.

Figure 6C:
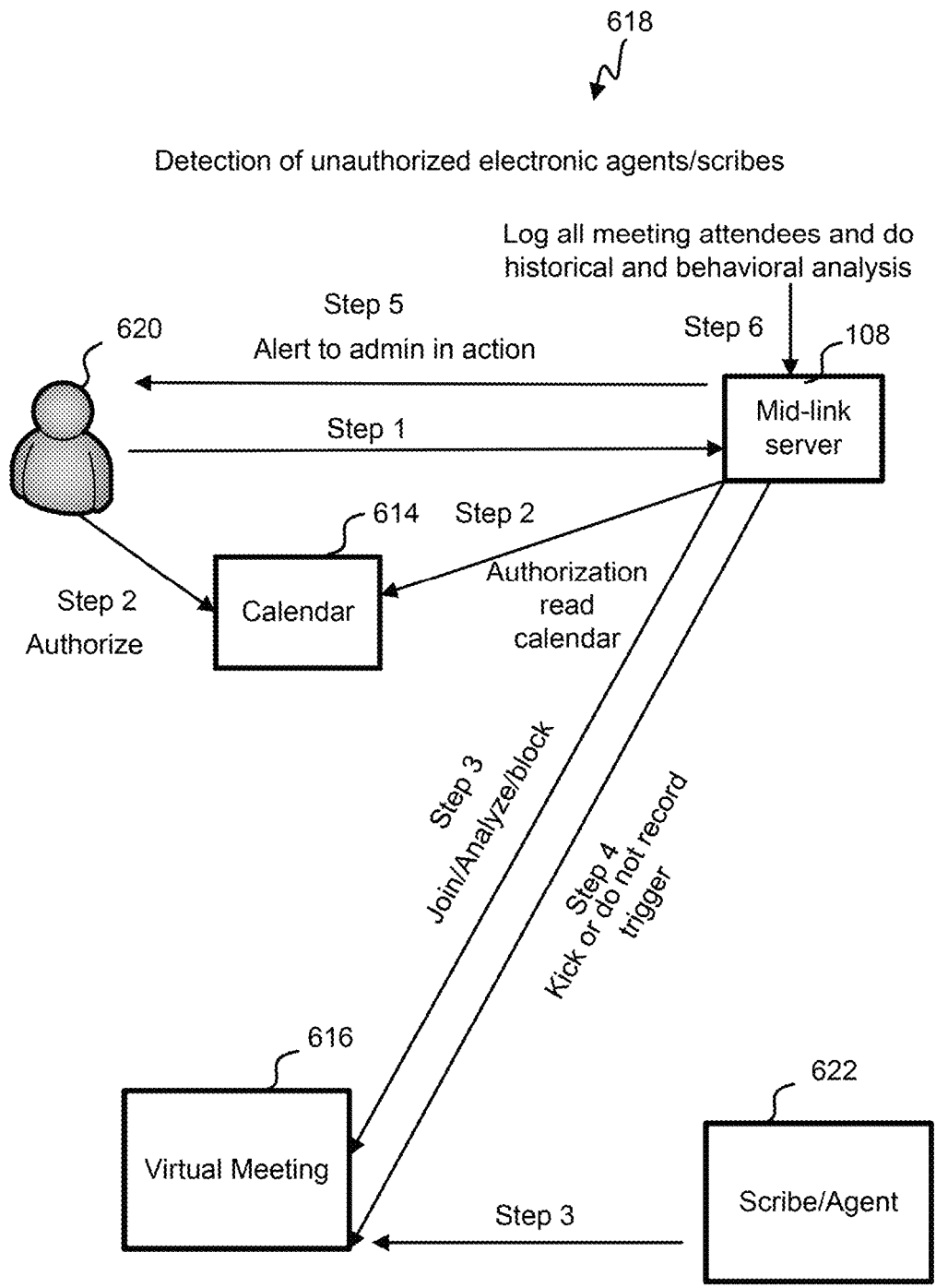
FIG. 6C illustrates a flow diagram of detection of unauthorized electronic agents/scribe services.

Referring next to FIG. 6C, a flow diagram 618 of detection of unauthorized electronic agents/scribe services is shown.

At step 1, an administrator 620 of an enterprise sends a request for authorization of the electronic agent/scribe service to the mid-link server 108. The electronic agent/scribe service is the virtual meeting application 616. The virtual meeting application 616 is linked with a calendar application 614 to identify slots in the calendar of the end users 106. At step 2, the mid-link server 108 and the administrator authorizes the calendar from the calendar application 614.

At step 3, the mid-link server 108 connects to the virtual meeting application 616 based on the authorization at step 2. The electronic agent/scribe service 622 initiates the connection to the virtual meeting application 616. The mid-link server 108 allows the end user 106 to join the virtual meeting application 616. The mid-link server 108 analyzes the interactions during the meeting among the members (end users 106). Based on the analysis and behavior of the end users 106 during the meeting, the mid-link server 108 can block any of the members (end users 106). At step 4, the mid-link server 108 may initiate kick or do not record trigger for the members of the meeting based on a suspicious activity of the end user(s) 106 or the authorization associated the virtual meeting application 616.

At step 5, an alert is triggered to the administrator 620 for action from the mid-link server 108. At step 6, the log of all meeting attendees (end users 106) is collected, and historical and behavioral analysis is performed by the mid-link server 108 to determine unauthorized electronic agents/scribe services.

Figure 7A:
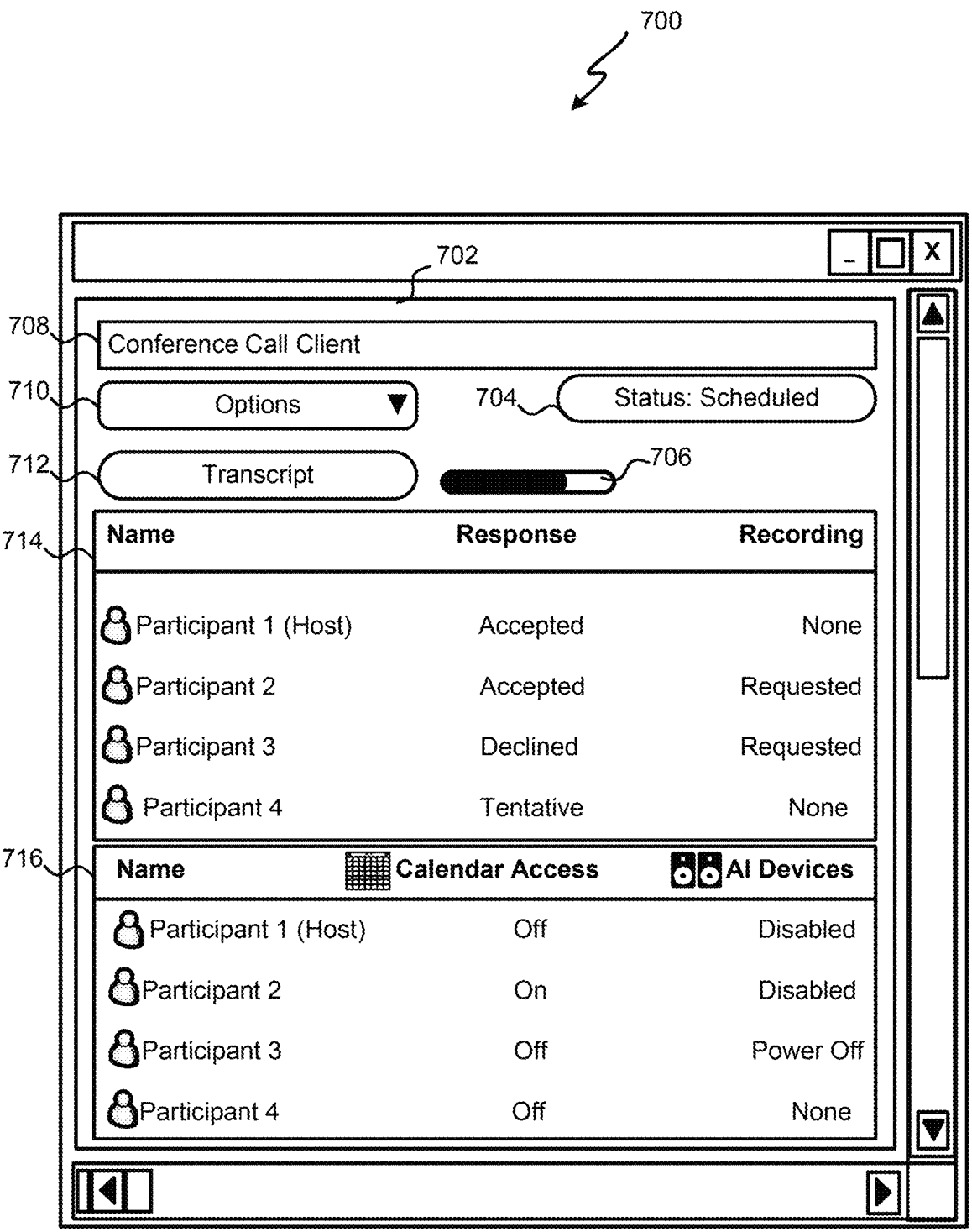
FIG. 7A illustrates a Graphical User Interface (GUI) associated with a policy-controlled security system for accessing an electronic agent.

Referring next to FIG. 7A, a Graphical User Interface (GUI) 700 associated with the policy-controlled security system 100 for accessing an electronic agent is shown. In present embodiment, the electronic agent is an online conference call application. However, in other embodiments, the electronic agent may be for example, a meeting application, a chatbot, a messaging application or a webinar tool. The GUI 700 is displayed to the end user(s) 106 on the client device(s) 102 for setting up conference calls by accessing the electronic agent via a remote application at the web server 104. The remote application is the online conference call application.

The GUI 700 includes a section 702 with various fields of a conference call system. A conference call client field 708 includes options field 710 for setting up a conference call such as sending invites to participants in the conference call. An organizer such as the end user 106 may use the options field 710 to set up the conference call. The conference call client field 708 is customized based on policies set by an administrator of an enterprise. The organizer and/or the participants are members of the enterprise. A status field 704 indicates a status of the conference call like scheduled, plan, or completed. The status field 704 is set by the organizer.

A transcript button 712 allows the organizer to enable transcript rights for the call using a select button 706. For example, selecting the transcript button 712 may enable sharing transcript of the call to the participants of the call after the call is over. A participant status field 714 enables the organizer to view responses from the participants on the call invite sent using the options filed 710. The status of the conference call from the participants may be displayed as accepted, declined or tentative. The participants may request the organizer for access to the recording of the call. The requests for recording the call from the participants is also displayed along with the responses.

An access designation field 716 has options for setting up calendar access and disabling AI devices around. Using the access designation field 716 enables the organizer to set up calendar access rights for the participants. Accessing calendars while setting up calls or chats may pose privacy concerns for the participants. AI devices within a certain area of the participants for example, within 20-30 meters from the participants may be disabled or powered off for the security and privacy of the conference call according to an enterprise policy.

Figure 7B:
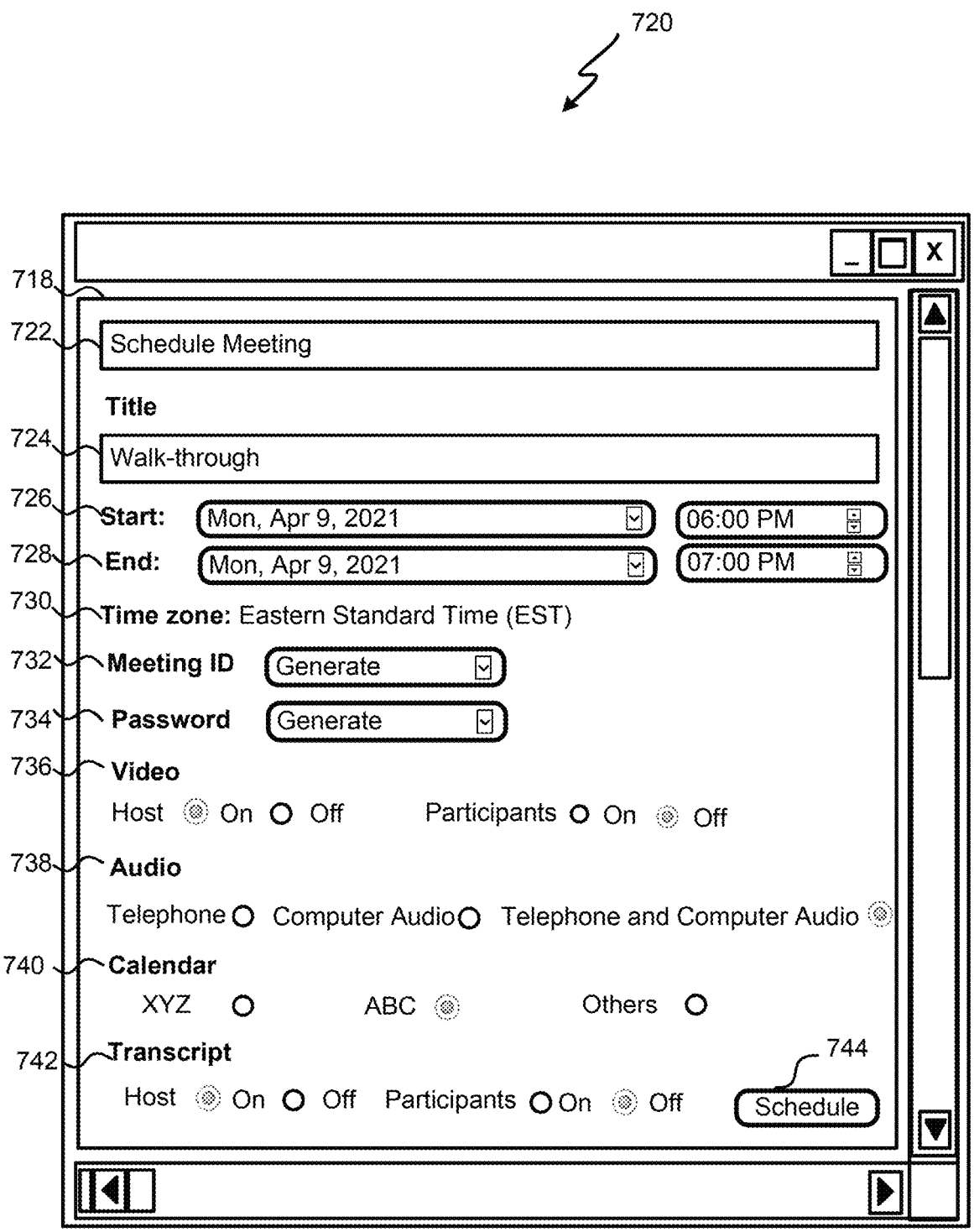
FIG. 7B illustrates a Graphical User Interface (GUI) associated with a policy-controlled security system for scheduling a meeting using an electronic agent.

Referring next to FIG. 7B, a Graphical User Interface (GUI) 720 associated with the policy-controlled security system 100 for scheduling a meeting using an electronic agent is shown. The GUI 720 is presented to the end user(s) 106 on the client device(s) 102 for scheduling meetings by accessing the electronic agent via a remote application at the web server 104. The remote application being a meeting application in this example. A meeting setup field 718 of the meeting application is used to set up the meeting by the end user 106. A schedule meeting tab 722 populates various options for the end user 106 to set up the meeting.

A title of the meeting may be setup using the title field 724. For example, 'walkthrough' may be the title for the meeting. The start and end time indicating day, date and time is set using time selection fields 726 and 728, respectively. A time zone for the meeting may be setup using a time zone selection field 730. Meeting ID and password are generated using selection fields 732 and 734, respectively. Videos may be set for the host that is the end user 106 and the participants using a video setup field 736. An audio setup 738 may be used for setting up an audio for the host. Calendar applications to be used for the meetings may be set using a calendar setup field 740. Transcript of the meeting conversation may be set for the host and the other participants using a transcript setup field 742. Finally, after setting up all the fields of the meeting application, the meeting is scheduled by pressing a schedule button 744. A meeting notification is sent to all the participants as the meeting schedule is set by the end user 106.

Figure 8:
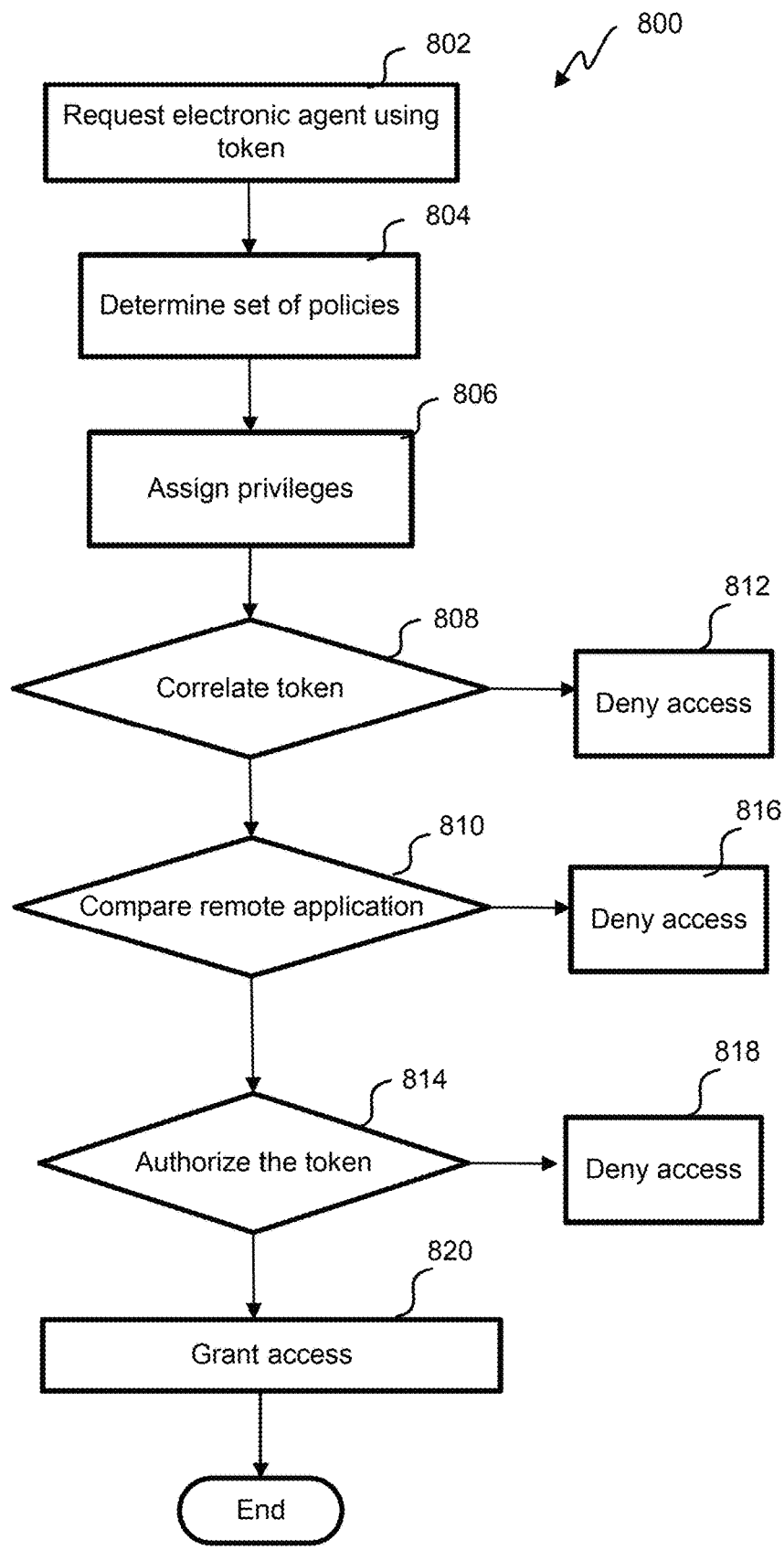
FIG. 8 illustrates a flowchart of a method of a policy-controlled security system for a client device.

Referring next to FIG. 8, a flowchart of a method 800 of a policy-controlled security system 100 for a client device 102 is shown. The depicted portion of the process begins at block 802 where an end user 106 of the client device 102 loads a browser or a local application at the client device 102 to request access to an electronic agent. A token is required for accessing the electronic agent. The end user 106 desires to access the service at a first mile that is the client device 102 by sending the request using the token to a remote application at the web server 104. The mid-link server 108 acts as an intermediate server controlling the token at a middle mile based on a set of policies. The web server 104 provides the end user 106 access to the electronic agent at a last mile.

At block 804, a set of policies corresponding to the electronic agent is determined from the policy database 304. A number of policies are set by an administrator of an enterprise of the end user 106 based on an enterprise policy, a confidentiality associated with a functionality of the electronic agent, the remote application of the electronic agent, user logs, and/or a role of the end user 106. The number of policies specifies controlled access to electronic agents. The controlled access includes restrictive use of a functionality of the electronic agents, authorized access to shared content, and/or access to the electronic agent by only authorized participants.

At block 806, privileges associated with the policies are assigned from the privilege store 506. The privileges allow the end user 106 to assign access rights to other participants of the electronic agents based on the policies. The access rights are related to accessing of various functionalities of the electronic agents like recording, sharing content, inviting members, and/or use of AI devices in a vicinity of the members.

At block 808, the token is correlated with a list of tokens in the token repository 312 to identify a user application associated with the token. The list of tokens also includes an authorization information associated with the token. If the token has a match within the list of tokens, then the control moves to block 810, else if there is no match found within the list of tokens, then the access is denied at block 812. The end user 106 may request for re-authorization to the administrator when the token is denied. Based on an analysis performed by the administrator either the token is granted access or is blocked.

At block 810, after the user application of the token is identified, it is compared with the remote application in the request. If the user application is the remote application, then the remote application and the corresponding token is authorized at block 814 else the access using the token is denied at block 818.

At block 814, the token is authorized for use based on the match of the user application with the remote application. A list of the remote applications and their corresponding tokens are authorized for accessing the electronic agent. The authorized remote application and the token enables access to the electronic agent.

At block 820, based on the authorization, the access is granted to the token. The end user 106 is provided access to the electronic agent using the token. The end user 106 is provided controlled access to the electronic agent based on the set of policies.

Figure 9:
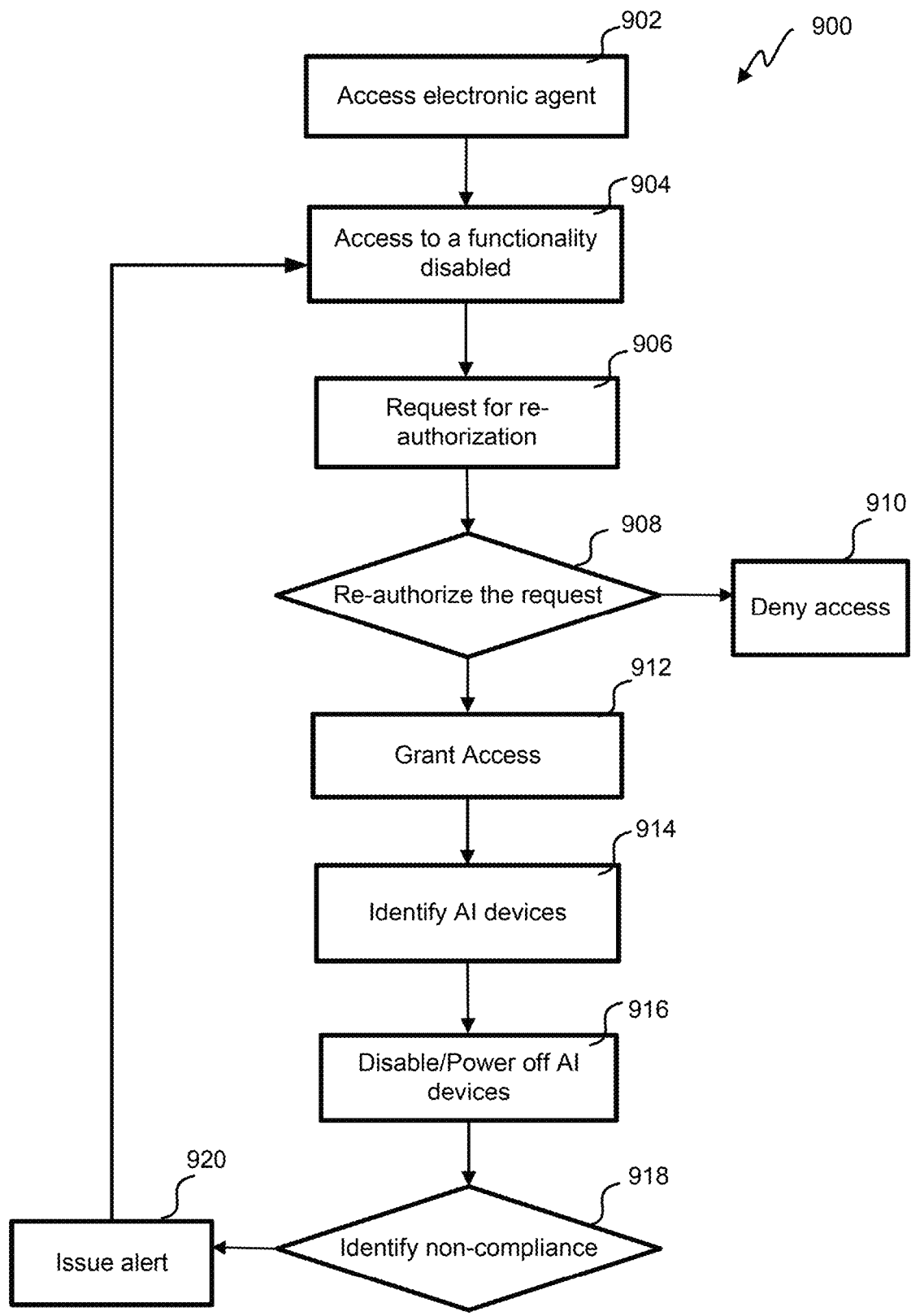
FIG. 9 illustrates a flowchart of a method of a policy-controlled security system for performing an audit while accessing an electronic agent.

Referring next to FIG. 9, a flowchart of a method 900 of a policy-controlled security system 100 for performing an audit while accessing the electronic agent is shown. The depicted portion of the process begins at block 902 where the end user 106 of the client device 102 is provided access to the electronic agent based on a set of policies. The end user 106 who is a host initiates a session of the electronic agent. The end user 106 invites other participants to the session. The end user 106 assigns the privileges to the participants based on the set of policies. The privileges are associated with usage of different functionalities of the electronic agent during the session such as recording, sharing, enabling/disabling AI devices, or inviting other participants. The functionalities are based on the set of policies.

At block 904, access to a functionality may be disabled based on the set of policies. For example, recording during the session may be disabled based on the set of policies. However, the end user 106 may require access to the recording. The end user 106 may send a request for re-authorization to an administrator of an enterprise at block 906.

At block 908, the administrator analyses the request and based on the analysis, performs re-authorization. The request may be granted access at block 912 or denied access at block 910 based on the re-authorization.

At block 912, the access to the functionality is granted access based on the re-authorization. The end user 106 has access enabled for the functionality that was initially disabled based on the set of policies. The policies associated with the functionality are modified based on the re-authorization. The modified policies are updated in the policy store 110. The session is initiated by the end user 106 and the other participants.

At block 914, during the session, an audit is performed to identify whether AI devices around the end user 106 and the other participants are working based on the set of policies. The identification is performed using the remote application of the electronic agent. For example, the policies may require the AI devices around the end user 106 and the other participants within a distance of 50 meters to be disabled or only AI devices near the host may be enabled. Compliance with the policies is checked corresponding to AI devices.

At block 916, based on the audit, the AI devices around the end user 106 and the other participants that does not comply with the requirements of the policies are requested to be disabled or powered off. The non-complying participant or the host is provided with a notification to disable the AI devices as enabling them is against the policies. In cases of further non-compliance, the session may be revoked for the non-complying participant by the administrator or the end user 106.

At block 918, non-compliance to any of the policies during the session is monitored. For example, if recording functionality is not allowed, however a participant starts recording the session, an alert notification is immediately flashed to the participant and/or all other participants including the host regarding the non-compliance at block 920. In further cases of non-compliance by same participant, the access to the session may be blocked for the participant. The non-compliance of the policies and requests for re-authorization is continuously monitored until the session is complete. The control moves at block 904 for monitoring the requests.

Figure 10:
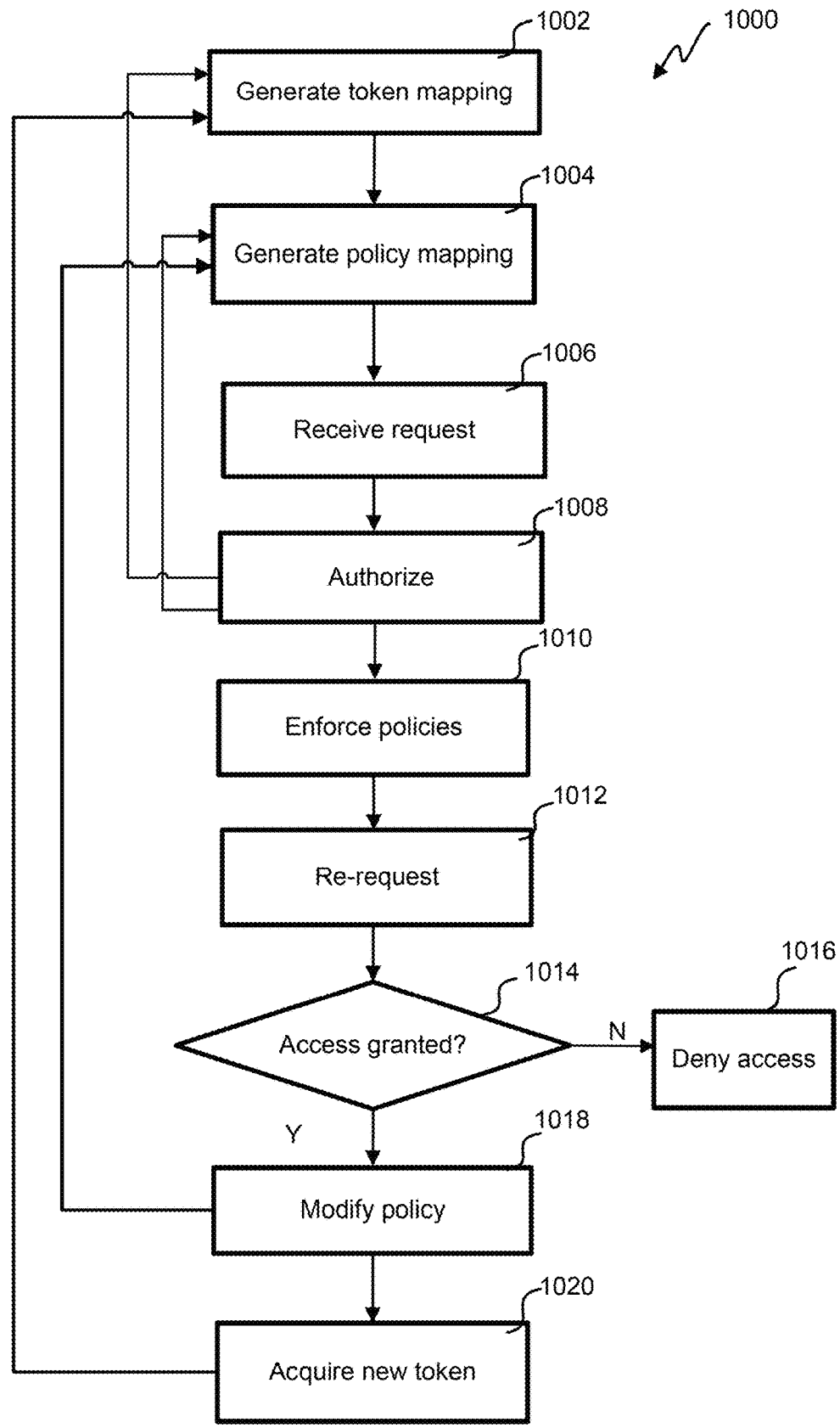
FIG. 10 illustrates a flowchart of a method of a policy-controlled security system for managing policies associated with an electronic agent.

Referring next to FIG. 10, a flowchart of a method 1000 of a policy-controlled security system 100 for managing the policies associated with the electronic agent is shown. The depicted portion of the process begins in block 1002 where a token mapping is generated by the administrator and/or the enterprise at the IT module 214. The token mapping includes a list of tokens mapped with their corresponding remote applications, and the electronic agents. The token mapping is stored in the token repository 312 of the mid-link server 108 by the IT module 214.

At block 1004, a policy mapping including a list of policies of the electronic agents mapped with their corresponding tokens, functionalities, and the remote applications is generated. The policies are preset by the administrator based on user logs, tenants of the client device(s) 102, confidentiality associated with the electronic agents or the remote applications of the electronic agents, and/or designations of the end user(s) 106 such as manager, trainee, or employee. The functionalities associated with the electronic agents include recording, sharing, inviting, or accessing calendars. The tokens of specific remote applications to be used for accessing the electronic agents are allowed by the policies. The policies also specify controlled access to the functionalities of the electronic agents.

At block 1006, a request for access to an electronic agent is received from the end user 106 of the client device 102. The end user 106 uses a local application running on the client device 102 to transmit the request to a remote application of the electronic agent which is running on a remote instance of the web server 104. A token is required by the electronic agent for the access.

At block 1008, the token associated with the request is authorized. A policy associated with the electronic agent is identified from the policy mapping. The corresponding token and the remote application of the request is identified from the token mapping and correlated within the list of tokens and the remote applications. Based on the correlation, the token is authorized.

At block 1010, after authorization, the policies are enforced on the client device 102. The access to the electronic agent based on the policy is provided to the end user 106 on the client device 102 from the remote instance. The access to the functionalities is provided based on the policies to the end user 106. The end user 106 may be assigned privileges for providing the controlled access to the functionalities of the electronic agent. For example, the end user 106 may assign recording rights to one or more other users while using the electronic agent.

At block 1012, a re-request is received from the client device 102 regarding access to a disabled functionality. The functionality like sharing content might be disabled based on the policy associated with the electronic agent. However, the end user 106 may re-request for consideration on the disabled functionality according to user requirement. The re-request is provided to the IT module 214 for analysis.

At block 1014, an authorization of the re-request is determined by the administrator from the IT module 214. Based on analyzing the policy and the user requirement, the administrator may either grant access to the functionality or keep the access to the functionality denied at block 1016.

At block 1018, the access to the functionality is granted and the policy corresponding to the electronic agent is modified. For example, the access to the functionality of sharing content may be enabled by the administrator and the corresponding policy is updated. The modified policy is updated in the policy mapping at block 1004.

At block 1020, another token corresponding to a new request for access to the electronic agent may be received. The token is compared with tokens in the list of tokens stored in the token mapping at block 1002. In case the token is new which is not found in the list of tokens. The token is verified by the administrator and then added to the list of tokens in the token mapping.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A policy-controlled access security system for managing access security to electronic agents in a cloud based multi-tenant system, the policy-controlled access security system comprising:
   a plurality of memories for storing code for the policy-controlled access security system;
   a client device having a local application, the local application executed on the client device to:
      provides a request for access to an electronic agent of a remote application run on a remote instance of a web server, wherein a token is required by the electronic agent;
   a policy store including a plurality of policies, wherein the plurality of policies specifying controlled access to a plurality of electronic agents of a plurality of remote applications, wherein the controlled access includes restrictive use of a functionality associated with the electronic agent, access to shared content, and/or access to the electronic agent by a plurality of end users, wherein the plurality of electronic agents includes at least one of online meeting, chatbots, web conferences, webinars, chatting platforms, and/or messaging applications; and
   a mid-link server, coupled to the client device, the mid-link server comprising:
      a confidentiality enterprise agent configured to:
         determine a set of policies from the plurality of policies corresponding to the electronic agent;
      a correlator:
         correlate the token with a plurality of tokens to identify a user application associated with the token, wherein the plurality of tokens of the plurality of remote applications are associated with the plurality of policies; and
         compare the remote application corresponding to the token from the request with the identified user application;
      an authorizer configured to:
         authorizes the token for accessing the electronic agent based on the comparison; and
      a router configured to:
         enforce the set of policies on the client device; and
         provide the access to the electronic agent based on the set of policies via the web server,
      wherein the confidentiality enterprise agent that:
         identify non-compliance with the set of policies during the access of the electronic agents;
         generate an alert to one or more of the plurality of end users based on the non-compliance;
         identify artificial intelligence (AI) devices within a threshold distance from an end user of the plurality of end users accessing the electronic agent; and
         disable the AI devices based on the set of policies.

2. The policy-controlled access security system for managing access security to electronic agents in a cloud based multi-tenant system as recited in claim 1, wherein the authorizer that:
based on the authorization, either:
authorizes the token for accessing the electronic agent via the remote application, or
blocks the token when unauthorized to prevent access to the electronic agent.

3. The policy-controlled access security system for managing access security to electronic agents in a cloud based multi-tenant system as recited in claim 1, wherein the plurality of policies corresponding to the functionality are modified based on a new request from the client device.

4. The policy-controlled access security system for managing access security to electronic agents in a cloud based multi-tenant system as recited in claim 1, wherein the plurality of policies is based on a tenant of the client device, a type of network connection, confidentiality associated with the functionality and the plurality of remote applications, user logs, and/or a user designation associated with the client device.

5. The policy-controlled access security system for managing access security to electronic agents in a cloud based multi-tenant system as recited in claim 1, wherein the confidentiality enterprise agent that:
assigns a plurality of privileges to the client device for access to the electronic agent based on the set of policies, wherein the set of policies specifies the plurality of privileges associated with the controlled access to the electronic agent.

6. A method for policy-controlled access security to electronic agents in cloud-based multi-tenant systems comprising a plurality of memories, the method comprising:
requesting by a local application running on a client device, access to an electronic agent of a remote application run on a remote instance of an agent server, wherein a token is required by the electronic agent;
determining a set of policies from a plurality of policies corresponding to the electronic agent, wherein:
the plurality of policies specifies controlled access to a plurality of electronic agents of a plurality of remote applications,
the controlled access includes restrictive use of a functionality associated with the electronic agents, access to shared content, and/or access to the electronic agent by a plurality of end users,
wherein the plurality of electronic agents includes at least one of online meeting, chatbots, web conferences, webinars, chatting platforms, and/or messaging applications;
correlating the token with a plurality of tokens in a token repository for identifying a user application associated with the token;
comparing the remote application corresponding to the token from the request with the identified user application;
determining an authorization by a mid-link server corresponding to the token for accessing the electronic agent based on the comparison;
enforcing the set of policies on the client device;
identifying non-compliance with the set of policies during the access of the electronic agents, wherein an alert is generated for one or more of the plurality of end users based on the non-compliance;
providing the access to the electronic agent based on the set of policies via the agent server;
identifying artificial intelligence (AI) devices within a threshold distance from an end user of the plurality of end users accessing the electronic agent; and
disabling the AI devices based on the set of policies.

7. The method for policy-controlled access security to electronic agents in cloud-based multi-tenant systems as recited in claim 6, wherein the plurality of policies corresponding to the functionality are modified based on a new request from the client device.

8. The method for policy-controlled access security to electronic agents in cloud-based multi-tenant systems as recited in claim 6, wherein the plurality of policies is based on a tenant of the client device, a type of network connection, confidentiality associated with the functionality and the plurality of remote applications, user logs, and/or a user designation associated with the client device.

9. The method for policy-controlled access security to electronic agents in cloud-based multi-tenant systems as recited in claim 6, further comprising assigning a plurality of privileges to the client device for accessing the electronic agent based on the set of policies, wherein the set of policies specifies the plurality of privileges associated with the controlled access to the electronic agent.

10. A non-transitory medium for managing secure access to electronic agents in cloud-based multi-tenant systems, the non-transitory medium comprising code for:
requesting from a web server by a local application executed on a client device, access to an electronic agent of a remote application run on a remote instance of an agent server, wherein a token is required by the electronic agent;
determining a set of policies from a plurality of policies corresponding to the electronic agent, wherein:
the plurality of policies specifies controlled access to a plurality of electronic agents of a plurality of remote applications,
wherein the plurality of electronic agents includes at least one of online meeting, chatbots, web conferences, webinars, chatting platforms, and/or messaging applications;
the controlled access includes restrictive use of a functionality associated with the electronic agents, access to shared content, and/or access to the electronic agent by a plurality of end users;
identifying non-compliance with the set of policies during the access of the plurality of electronic agents;
generating an alert to one or more of the plurality of end users based on the non-compliance;
correlating the token with a plurality of tokens in a token repository for identifying a user application associated with the token;
comparing the remote application corresponding to the token from the request with the identified user application;
determining an authorization by a mid-link server corresponding to the token for accessing the electronic agent based on the comparison;
assigning a plurality of privileges to the client device for accessing the electronic agent based on the set of policies, wherein the set of policies specifies the plurality of privileges associated with the controlled access to the electronic agent;
enforcing the set of policies on the client device;
providing the access to the electronic agent based on the set of policies via the agent server;

identifying artificial intelligence (AI) devices within a threshold distance from an end user of the plurality of end users accessing the electronic agent; and disabling the AI devices based on the set of policies.

11. The non-transitory medium for managing secure access to electronic agents in cloud-based multi-tenant systems as recited in claim 10, wherein the plurality of policies is based on a tenant of the client device, a type of network connection, confidentiality associated with the functionality and the plurality of remote applications, user logs, and/or a user designation associated with the client device.

12. The non-transitory medium for managing secure access to electronic agents in cloud-based multi-tenant systems as recited in claim 10, further comprising identifying non-compliance with the set of policies during the access of the electronic agents, wherein an alert is generated for one or more of the plurality of end users based on the non-compliance.

* * * * *